United States Patent Office 3,642,995
Patented Feb. 15, 1972

3,642,995
METHOD OF CONTROLLING FUNGUS GROWTH USING SALT OF ALKYLBENZENESULFONIC ACIDS
Walter Schenk, Bad Durkheim, and Ernst-Heinrich Pommer, Limburgerhof, Pfalz, Germany, assignors to Badische Anilin- & Soda-Fabrik Aktiengesellschaft, Ludwigshafen (Rhine), Germany
No Drawing. Original application May 23, 1967, Ser. No. 640,508. Divided and this application Oct. 6, 1969, Ser. No. 871,003
Claims priority, application Germany, June 4, 1966, P 15 42 827.0
Int. Cl. A01n 9/22
U.S. Cl. 424—248               1 Claim

ABSTRACT OF THE DISCLOSURE

Salts of alkylbenzenesulfonic acids, in particular salts of morpholine, which may be substituted by methyl radicals, and alkylbenzenesulfonic acids, and methods of controlling fungi with said compounds.

---

This application is a division of application Ser. No. 640,508, filed May 23, 1967, and now abandoned.

This invention relates to morpholine salts of alkylbenzenesulfonic acids and their use for controlling fungi.

It is known that zinc ethylene-bis-dithiocarbamate and tetramethylthiuram disulfide may be used for controlling fungi. However their action is not satisfactory.

An object of this invention is to provide new active ingredients which have an excellent fungicidal action, i.e. they are suitable for preventing various objects from becoming infected with fungi.

This and other objects of the invention are achieved with salts of alkylbenzenesulfonic acids having the formula

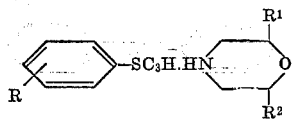

in which R is an alkyl radical with ten to thirteen carbon atoms and $R^1$ and $R^2$ are hydrogen or a methyl radical, which have a very good fungicidal action.

The preparation of alkylbenzenesulfonic acids may be carried out continuously or batchwise by reacting alkylbenzenes, whose alkyl groups contain ten to thirteen carbon atoms, with conventional sulfonating agents. The sulfonating agents, e.g. gaseous $SO_3$, fuming sulfuric acid, sulfuric acid monohydrate or concentrated sulfuric acid, are used in a relatively large excess, e.g. in an amount between about 1.05 and 6 moles per mole of alkylbenzene. The sulfonation temperature may be between 30° and 60° C. depending on the reaction conditions.

In all the methods an alkylsulfonic acid is formed which still contains large amounts of sulfuric acid. By adding water, the almost homogenous sulfonation mixture is converted to an unstable emulsion of sulfonic acid and sulfonating agent; after allowing the emulsion to settle and separating the waste sulfuric acid, an arylsulfonic acid is obtained with a purity of 86 to 90%.

The reaction to the morpholine salt is carried out by placing the morpholine base in a stirred vessel and allowing the sulfonic acid to drip in, the temperature being kept at 30° to 40° C. by cooling. The pH value should be between 7 and 8 after neutralization.

The morpholine salt of $C_{11-13}$-alkylbenzene sulfonate is obtained as a yellow viscous liquid with a solidification point of about 3° C., whereas the corresponding 2,6-dimethylmorpholine salt is obtained as a yellow-brown, low-viscosity liquid with a solidification point of −10° C.

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate bascity may be used as salts in aqueous solutions even after formation of the salt.

Dusts may be prepared by mixing or grinding the active ingredients with a solid carrier.

The active ingredients may be used on their own or together with other active ingredients, for example organic fungicides or insecticides. They are suitable for controlling downy mildew or other fungi, e.g. *Aspergillus niger*.

EXAMPLE 1

The upper surface of the leaves of tomato seedlings of the Professor Rudloff species are sprayed with aqueous formulations of 80% of active ingredient and 20% of sodium lignin sulfonate. After the spray coating has dried the leaves are infected with a zoospore suspension of *Phytophthora infestans*. The plants are placed in a cabinet saturated with water vapor at 16° to 18° C. and left there for six days. At the end of this period the disease in the case of the untreated control plants has developed so vigorously that the results of the experiment can be assessed.

The following table shows these results.

| Active ingredient | Extent of attack on leaves [1] |
|---|---|
| $C_{10}H_{21}$—⟨⟩—$SO_3H \cdot HN$⟨O⟩ | 0.5 |
| $C_{10}H_{21}$—⟨⟩—$SO_3H \cdot HN$⟨O⟩ with $CH_3$, $CH_3$ | 0.1 |
| $C_{11-13}H_{23-27}$—⟨⟩—$SO_3H \cdot HN$⟨O⟩ | 0.3 |
| $C_{11-13}H_{23-27}$—⟨⟩—$SO_3H \cdot HN$⟨O⟩ with $CH_3$, $CH_3$ | 0.1 |
| Zinc ethylene-bis-dithiocarbamate (agent for comparison) | 0.8 |
| Control (untreated) | 4.5 |

[1] After spraying with 0.5% spray liquor.

NOTE.—0 = no attack on leaves, graded up to 5 = leaves completely infested.

EXAMPLE 2

The leaves of potted grapes of the Müller-Thurgau species are sprayed with aqueous dispersions containing 80% of active ingredient and 20% of sodium lignin sulfonate on the dry substance. 0.125% spray liquors (with reference to the dry substance) are used. After the spray coating has dried the leaves are infected with a zoospore suspension of *Plasmopara viticola*. The plants are first put in a cabinet saturated with water vapor for sixteen hours at 20° C. and then in a greenhouse for eight days at temperatures between 20° and 30° C. In order to accelerate and intensify sporangiophore outbreak, the plants are put back into the moist cabinet for a further sixteen hours.

Then the spore sites on the underside of the leaves are counted. Untreated infected control plants serve as a comparison.

| Active ingredient | Percentage of leaves attacked [1] |
|---|---|
| $C_{10}H_{21}$—⟨phenyl⟩—$SO_3H\cdot HN$⟨morpholine⟩ | 4 |
| $C_{10}H_{21}$—⟨phenyl⟩—$SO_3H\cdot HN$⟨2,6-dimethylmorpholine⟩ | 6 |
| $C_{11-13}H_{23-27}$—⟨phenyl⟩—$SO_3H\cdot HN$⟨morpholine⟩ | 6.5 |
| $C_{11-13}H_{23-27}$—⟨phenyl⟩—$SO_3H\cdot HN$⟨2,6-dimethylmorpholine⟩ | 10 |
| Zinc ethylene-bis-dithiocarbamate (agent for comparison) | 23 |
| Control (untreated) | 100 |

[1] After spraying with 0.125% spray liquor.

EXAMPLE 3

The table below shows the inhibition values in respect of the fungus *Aspergillus niger* in a nutrient solution. The nutrient solutions were inoculated with fungus spores and incubated for 120 hours at 36° C. Then the extent of fungus growth was determined.

| Active ingredient | Amount of active ingredient in nutrient solution in parts of ingredient per million parts of solution | | | | | |
|---|---|---|---|---|---|---|
| | 100 | 75 | 50 | 25 | 10 | 5 |
| $C_{10}H_{21}$—⟨phenyl⟩—$SO_2H\cdot HN$⟨morpholine⟩ | 0 | 1 | 2 | 4 | 5 | 5 |
| $C_{10}H_{21}$—⟨phenyl⟩—$SO_3H\cdot HN$⟨2,6-dimethylmorpholine⟩ | 0 | 1 | 3 | 5 | 5 | 5 |
| $C_{11-13}H_{23-27}$—⟨phenyl⟩—$SO_3H\cdot HN$⟨morpholine⟩ | 0 | 0 | 0 | 0 | 2 | 4 |
| $C_{11-13}H_{23-27}$—⟨phenyl⟩—$SO_3H\cdot HN$⟨2,6-dimethylmorpholine⟩ | 0 | 0 | 1 | 1 | 3 | 4 |
| Tetramethylthiuram disulfide (agent for comparison) | 1 | 2 | 2 | 4 | 5 | 5 |
| Control (untreated) | 5 | 5 | 5 | 5 | 5 | 5 |

NOTE.—0=no fungal growth, graded up to 5=unretarded fungal growth.

We claim:
1. A method of controlling fungus growth which comprises: applying to said fungus growth a fungitoxic amount of a salt of an alkylbenzenesulfonic acid having the formula

$$R-\text{C}_6\text{H}_4-SO_3H\cdot HN\begin{pmatrix}R^1\\O\\R^2\end{pmatrix}$$

in which R is alkyl of 10 to 13 carbon atoms and $R^1$ and $R^2$ are hydrogen or methyl.

References Cited

UNITED STATES PATENTS 2,862,848    12/1958    Keenan _____ 424—352

JEROME D. GOLDBERG, Primary Examiner